M. B. HERMAN.
IRRIGATING PAN FOR SURGICAL USE.
APPLICATION FILED MAR. 1, 1916.

1,245,915.

Patented Nov. 6, 1917.

WITNESSES:
E. W. Callaghan
H. E. Beck

INVENTOR
MAXENCE B. HERMAN,

BY
Munn & Co.
ATTORNEYS

UNITED STATES PATENT OFFICE.

MAXENCE BRULL HERMAN, OF MEMPHIS, TENNESSEE.

IRRIGATING-PAN FOR SURGICAL USE.

1,245,915.      Specification of Letters Patent.      Patented Nov. 6, 1917.

Application filed March 1, 1916. Serial No. 81,447.

*To all whom it may concern:*

Be it known that I, MAXENCE BRULL HERMAN, a citizen of the United States, and a resident of Memphis, in the county of Shelby and State of Tennessee, have invented an Improvement in Irrigating-Pans for Surgical Use, of which the following is a specification.

My invention is an improved pan or liquid receiver for use of surgeons and physicians in irrigating the male urethra and bladder. The pan is substantially triangular in form and provided with vertical sides which terminate at their upper edges in a flaring rim, whereby the pan is adapted for insertion and self-support between the distended thighs of a patient when seated on a chair or other support; and it is further distinguished by the form of its narrower end, which particularly adapts it for contact with the patient's body between his thighs during the irrigating operation.

The details of construction and operation are as hereinafter described and illustrated in the accompanying drawing, in which.

Figure 1:
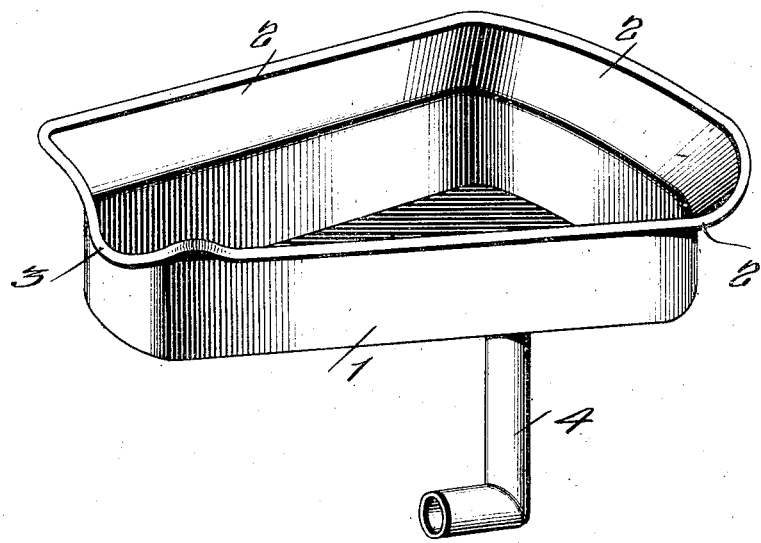
Figure 1 is a perspective view of the pan with a waste pipe attachment.
Figure 2:
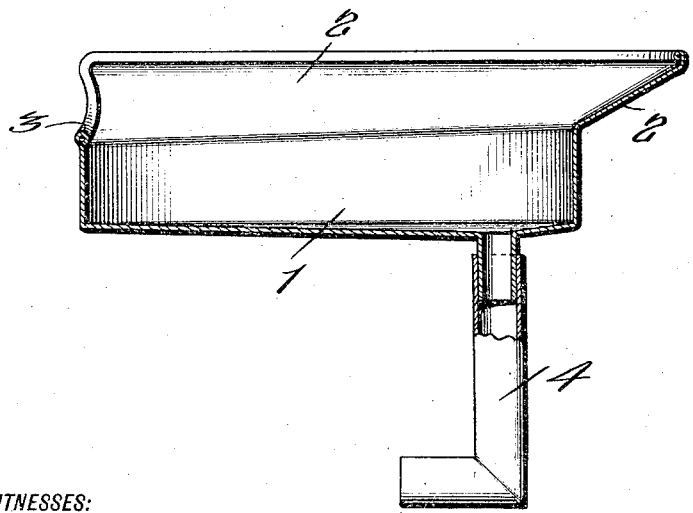
Fig. 2 is a central longitudinal section of the same.

The pan is preferably constructed of thin sheet metal and has approximately the form of a truncated triangle. The body or base portion 1 is vertical and its top portion 2 is a flared rim that extends entirely around the part 1 save at the front or narrow end, where the rim is cut out as indicated at 3 to adapt the pan to conform to and underlie a portion of the patient's body intermediate the thighs. The edge of the rim is curled or rolled, as shown, to blunt and strengthen it.

In using the pan, the patient being in seated position, the pan is placed between his thighs, which are spread apart for the purpose, and the flaring rim 2 rests upon his thighs so that the pan is supported and held firmly in horizontal position. The irrigating operation is then proceeded with and the patient's clothes and person are perfectly protected from the liquid used by the surgeon or physician.

The pipe 4 pendent from the slightly concave bottom of the pan serves to convey waste liquid into any suitable receptacle that may be placed under the pan.

I claim:

An irrigating pan for surgical use having a substantially triangular form, its several sides, save at the front which is cut away, being vertical and merging into an outwardly flaring rim, as shown and described.

MAXENCE BRULL HERMAN.

Copies of this patent may be obtained for five cents each, by addressing the "Commissioner of Patents, Washington, D. C."